Patented Feb. 20, 1940

2,191,040

UNITED STATES PATENT OFFICE 2,191,040

PROCESS OF COLORING

James G. McNally and Joseph B. Dickey, Rochester, N. Y., and Werner H. Zugschwerdt, Kingsport, Tenn., assignors to Eastman Kodak Company, Rochester, N. Y., a corporation of New Jersey No Drawing. Application January 14, 1939, Serial No. 251,036

7 Claims. (Cl. 8—50)

This invention relates to the art of dyeing or coloring. More particularly it relates to the dyeing or coloration of organic derivatives of cellulose with nuclear non-sulfonated azo compounds which may be prepared by coupling a diazotized primary aromatic amine with a mono-ether of resorcinol and catechol. The invention includes the process of dyeing or coloring organic derivatives of cellulose with said nuclear non-sulfonated azo compounds and material made of or containing an organic derivative of cellulose colored with said nuclear non-sulfonated azo compounds.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of our invention to provide a process for the coloration of material made of or containing an organic derivative of cellulose.

A specific object is to provide a process for the coloration of organic derivatives of cellulose wherein the dye compound is applied directly to the material undergoing coloration from an aqueous suspension.

A further object is to provide material made of or containing an organic derivative of cellulose dyed or colored with the dye compounds of the invention.

While our invention will be described more particularly in connection with the coloration of cellulose acetate silk, it will be understood that it applies to the coloration of other organic derivatives of cellulose such as those above mentioned.

The azo compounds employed in the process of our invention have the general formulae:

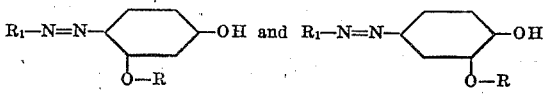

wherein $R_1$ represents a nuclear non-sulfonated aromatic nucleus and R represents an alkyl group, an alkaryl group and an aryl group. Advantageously $R_1$ is a phenyl nucleus. This phenyl nucleus $R_1$, as clearly shown hereinafter, may be substituted or unsubstituted and accordingly it will be understood that $R_1$ as used throughout the specification and claims includes a substituted as well as an unsubstituted phenyl nucleus.

The term alkyl as used herein, unless otherwise indicated, includes not only unsubstituted alkyl groups such as a methyl group, an ethyl group or a propyl group, but also substituted alkyl groups such as β-hydroxyethyl, β-, γ, hydroxypropyl, β-methoxyethyl or β-ethoxyethyl for example. As illustrative of alkaryl may be mentioned benzyl.

The azo dye compounds employed in the process of our invention may be prepared by diazotizing a nuclear non-sulfonated aromatic amine and coupling the diazonium compound obtained with a mono-ether of resorcinol and catechol. The preparation of certain of the dye compounds which may be employed in the process of our invention is described by Daniel and Fletcher in Transactions Kansas Academy of Science, volume 37, pages 119-122 (1934). It is to be noted, however, that while the Daniel and Fletcher article referred to describes certain of the azo dye compounds employed by applicants, there is no teaching whatsoever that they can be employed to color organic derivatives of cellulose.

The following examples illustrate the preparation of the azo dye compounds employed in the process of our invention:

*Example 1*

12.3 grams of o-anisidine are dissolved in 200 cc. of water to which has been added 25 cc. of 36% hydrochloric acid. The resulting solution is cooled to a temperature approximating 0–5° C. by the addition of ice, for example, and the o-anisidine is diazotized while maintaining this temperature by adding, with stirring, 6.9 grams of sodium nitrite dissolved in water.

12.4 grams of guaiacol are dissolved in 125 cc. of water to which has been added 12 grams of sodium hydroxide and the resulting solution is cooled to a temperature approximating 0–10° C. The diazonium compound prepared as described above is slowly added, with stirring, while maintaining the temperature at 0–10° C. Upon completion of the coupling reaction which takes place the mixture resulting is made acid to litmus by the addition of acetic or hydrochloric acid and the dye compound formed is recovered by filtration, washed with water and dried. The dye compound obtained colors cellulose acetate silk a yellow shade.

*Example 2*

17.2 grams of p-bromoaniline are diazotized in accordance with the method described in Example 1.

12.4 grams of resorcinol mono-methyl ether are added to 200 cc. of water to which has been added 30 grams of sodium carbonate. The resulting mixture is cooled to a temperature approximating 0–10° C. and the diazonium solution prepared as described above is slowly added with vigorous stirring. Upon completion of the coupling reaction which takes place the mixture is made acid to litmus by the addition of acetic acid and the dye compound formed is recovered by filtration, washed with water and dried. The dye compound obtained colors cellulose acetate silk an orange-yellow shade.

*Example 3*

15.8 grams of 1-amino-2-methoxy-5-chlorobenzene are diazotized in known fashion and the diazonium compound obtained is coupled with 18.6 grams of resorcinol mono-phenyl ether. The coupling reaction may be carried out in accordance with the method described in Example 2. The dye compound obtained colors cellulose acetate silk an orange-yellow shade.

*Example 4*

16.8 grams of 1-amino-3-nitro-6-methoxybenzene are diazotized in known manner and the diazonium compound obtained is coupled with 20 grams of catechol mono-benzyl ether. The coupling reaction may be carried out in accordance with the method described in Example 2. The diazonium compound obtained colors cellulose acetate silk an orange-yellow shade.

*Example 5*

13.5 grams of p-aminoacetophenone are diazotized in known fashion and the diazonium compound obtained is slowly added, with stirring, to an iced alkaline solution of 15.4 grams of resorcinol mono-propyl ether. The mixture resulting is allowed to stand until coupling is complete after which it is made acid to litmus by the addition of acetic acid. The dye compound formed is recovered by filtration, washed with water and dried. The dye compound obtained colors cellulose acetate silk an orange shade.

*Example 6*

15.4 grams of resorcinol mono-beta-hydroxyethyl ether are coupled with 13.5 grams of diazotized p-aminoacetophenone. The coupling reaction may be carried out in accordance with the method described in Example 5. The dye compound obtained colors cellulose acetate silk an orange shade.

*Example 7*

$\frac{1}{10}$ gram mole of 1-amino-2-methyl-4-chloroaniline are diazotized in known manner and the diazonium compound obtained is coupled with $\frac{1}{10}$ gram mole of resorcinol mono-methyl ether. The dye compound obtained colors cellulose acetate silk a yellow shade.

The following tabulation further illustrates the compounds employed in the process of our invention together with the colors they produce on cellulose acetate silk. The compounds indicated below may be prepared by diazotizing the amines listed under the heading "Amine" and coupling the diazonium compounds obtained with the compounds specified in the column entitled Coupling component. The diazotization and coupling reactions may, for example, be carried out following the general procedure described in Examples 1 to 7 inclusive.

| Amine | Coupling component | Color on cellulose acetate silk |
|---|---|---|
| Aniline | 1. Resorcinol mono-methyl ether | Yellow. |
| Do | 2. Resorcinol mono-ethyl ether | Do. |
| Do | 3. Resorcinol mono-propyl ether | Do. |
| Do | 4. Resorcinol mono-benzyl ether | Do. |
| Do | 5. Resorcinol mono-phenyl ether | Do. |
| Do | 6. Catechol mono-methyl ether | Do. |
| Do | 7. Catechol mono-benzyl ether | Do. |
| Do | 8. Catechol mono-phenyl ether | Do. |
| o-Anisidine | 1–5 above | Do. |
|  | 6–8 above | Greenish-yellow. |
| m-Anisidine | 1–8 above | Yellow. |
| p-Anisidine | 1–8 above | Do. |
| o,m,p-Toluidine | 1–8 above | Do. |
| o,m,p-Chloroaniline | 1–8 above | Orange-yellow. |
| o,m,p-Bromoaniline | 1–8 above | Do. |
| o,m,p-Iodoaniline | 1–8 above | Do. |
| 1-amino-2-methyl-4-chlorobenzene | 1–8 above | Do. |
| 1-amino-2-bromo-4-methylbenzene | 1–8 above | Do. |
| o,p-Xenylamine | 1–8 above | Do. |
| o,p-Aminodiphenyl ether | 1–8 above | Do. |
| p-Aminoacetophenone | 1–8 above | Do. |
| p-Amino-m-chloroacetophenone | 1–8 above | Do. |
| p-Amino-m-iodoacetophenone | 1–8 above | Do. |
| 1-amino-2-methoxy-4-chlorobenzene | 1–8 above | Do. |
| 1-amino-2-nitro-4-chlorobenzene | 1–8 above | Do. |
| Cresidine | 1–8 above | Do. |
| 1-amino-3-nitro-6-methoxybenzene | 1–8 above | Do. |
| m-Nitroaniline | 1–8 above | Do. |
| p-Aminoacetophenone | Resorcinol mono-(4-methylphenyl) ether | Orange-yellow. |
| o-Bromoaniline | Catechol mono-(4-chlorophenyl) ether | Do. |
| p-Anisidine | Resorcinol mono-(2-methylphenyl) ether | Yellow. |
| p-Nitroaniline | Catechol mono-(4-nitrophenyl) ether | Orange-yellow. |

In carrying out the process of our invention, the non-sulfonated aromatic azo dye compounds employed in the process will ordinarily be applied to the organic derivative of cellulose material in the form of an aqueous suspension which can be prepared by grinding the dye to a paste in the presence of a sulfonated oil, soap or other suitable dispersing agent and dispersing the resulting paste in water. Dyeing operations can, with advantage be conducted at a temperature of 70–85° C. but any suitable temperature may be used. In accordance with the usual dyeing practice, the material to be dyed will ordinarily be added to the aqueous dyebath at a temperature lower than that at which the main portion of the dyeing is to be effected; a temperature approximating 45–55° C., for example, following which the temperature of the dyebath will be raised to that selected for carrying out the dyeing operation. The temperature at which the dyeing is conducted will vary somewhat depending, for example, on the particular organic derivative of cellulose or mixture of an organic derivative of cellulose and other material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that our process of dyeing includes coloration by printing and stencilling as well as coloration by strictly dyeing methods.

Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

*Example A*

2.5 parts of the dye compound prepared by coupling diazotized p-aminoacetophenone with resorcinol mono-propyl ether are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk in the form of yarn or fabric, for example, are added to the dyebath after which the temperature is gradually raised to 80–85° C. and the acetate silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored an orange shade of good fastness to light.

*Example B*

2.5 parts of the dye compound of Example 7 are substituted for the dye compound of Example A and dyeing is carried out as described in Example A. The cellulose acetate silk is colored a yellow shade of good fastness to light.

While our invention as above noted has been illustrated in connection with the dyeing of cellulose acetate silk textile materials, it will be understood that dyeing operations can be carried out in a manner similar to that described above by the substitution of another organic derivative of cellulose material for cellulose acetate silk or by employing dye compounds other than those employed in the examples or by substitution of both the material being dyed and the dye compounds of the examples.

We claim:

1. The process of coloring material made of or containing an organic derivative of cellulose which comprises applying thereto a nuclear non-sulfonated dye selected from the group consisting of azo compounds having the general formulae:

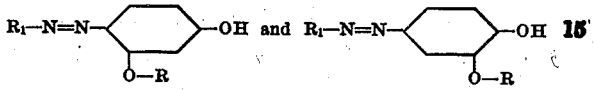

wherein $R_1$ represents an aryl nucleus of the benzene series and R represents a member selected from the group consisting of an alkyl group, an alkaryl group and an aryl group of the benzene series.

2. The process of coloring material made of or containing an organic derivative of cellulose which comprises applying thereto a nuclear non-sulfonated dye selected from the group consisting of azo compounds having the general formulae:

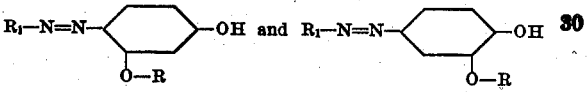

wherein $R_1$ represents an aryl nucleus of the benzene series and R represents an alkyl group.

3. The process of coloring a cellulose acetate which comprises applying thereto a nuclear non-sulfonated dye selected from the group consisting of azo compounds having the general formulae:

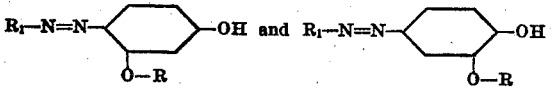

wherein $R_1$ represents an aryl nucleus of the benzene series and R represents a member selected from the group consisting of an alkyl group, an alkaryl group and an aryl group of the benzene series.

4. The process of coloring a cellulose acetate which comprises applying thereto a nuclear non-sulfonated dye selected from the group consisting of azo compounds having the general formulae:

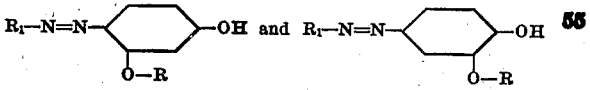

wherein $R_1$ represents an aryl nucleus of the benzene series and R represents an alkyl group.

5. Material made of or containing an organic derivative of cellulose colored with a nuclear non-sulfonated dye selected from the group consisting of azo compounds having the general formulae:

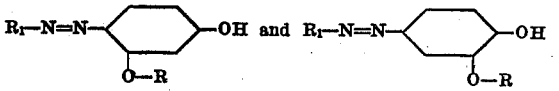

wherein $R_1$ represents an aryl nucleus of the benzene series and R represents a member selected from the group consisting of an alkyl group, an alkaryl group and an aryl group of the benzene series.

6. A cellulose acetate colored with a nuclear non-sulfonated dye selected from the group consisting of azo compounds having the general formulae:

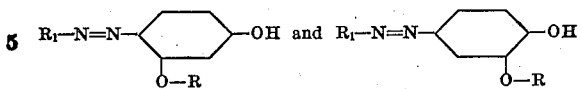

wherein $R_1$ represents an aryl nucleus of the benzene series and R represents a member selected from the group consisting of an alkyl group, an alkaryl group and an aryl group of the benzene series.

7. A cellulose acetate colored with a nuclear non-sulfonated dye selected from the group consisting of azo compounds having the general formulae:

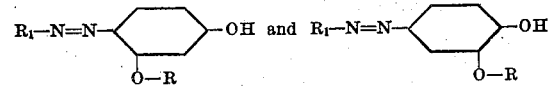

wherein $R_1$ represents an aryl nucleus of the benzene series and R represents an alkyl group.

JAMES G. McNALLY.
JOSEPH B. DICKEY.
WERNER H. ZUGSCHWERDT.